United States Patent [19]
Park et al.

[11] Patent Number: 6,095,195
[45] Date of Patent: Aug. 1, 2000

[54] WATER HAMMER ARRESTER

[75] Inventors: Kwang-Jin Park; Chang-Joon Park, both of Seoul, Rep. of Korea

[73] Assignee: AH-U Co., Ltd., Seoul, Rep. of Korea

[21] Appl. No.: 09/312,482

[22] Filed: May 17, 1999

[30] Foreign Application Priority Data

May 22, 1998 [KR] Rep. of Korea ...................... 98-18577

[51] Int. Cl.[7] .................................................. F16L 55/045
[52] U.S. Cl. .............................................. 138/31; 138/30
[58] Field of Search ........................................ 138/31, 30

[56] References Cited

U.S. PATENT DOCUMENTS

| | | | |
|---|---|---|---|
| 3,064,686 | 11/1962 | Gratzmuller | 138/31 |
| 3,158,180 | 11/1964 | Greer | 138/31 |
| 3,613,734 | 10/1971 | Elmer | 138/31 |
| 4,174,656 | 11/1979 | Duffey | 138/31 |
| 4,448,217 | 5/1984 | Mercier | 138/30 |
| 4,819,698 | 4/1989 | Ismert | 138/31 |
| 4,878,519 | 11/1989 | Berding et al. | 138/31 |
| 5,219,000 | 6/1993 | Chalasani et al. | 138/31 |
| 5,311,910 | 5/1994 | Hasegawa et al. | 138/30 |
| 5,385,172 | 1/1995 | Perrott et al. | 138/31 |

*Primary Examiner*—James Hook
*Attorney, Agent, or Firm*—Robert E. Bushnell, Esq.

[57] ABSTRACT

A water hammer arrester constructed with a cylindrical housing having a closed upper end and an internal pressure chamber. A piston slidably installed within the housing to receive a reaction force medium such as gaseous nitrogen, provides a space that communicates with an integral pressure chamber within the closed upper end of the housing. A threaded connector bearing a nipple circumscribed with a plurality of circumferential grooves is crimped into the neck of the lower end of the housing.

17 Claims, 9 Drawing Sheets

WATER HAMMER ARRESTER

CLAIM OF PRIORITY

This application makes reference to, incorporates the same herein, and claims all benefits accruing under 35 U.S.C. □ 19 from my application entitled WATER HAMMER ARRESTOR filed with the Korean Industrial Property Office on May 22, 1998 and there duly assigned Ser. No. P98-18577 by that Office.

BACKGROUND OF THE INVENTION

1. Field of the Invention

The present invention relates to a water hammer arrester, more particularly, to a water hammer arrester having nitrogen gas, as a medium of reaction force, filled up in an internal pressure chamber formed within a housing and being capable of reducing a whole length of a housing.

2. Discussion of Related Art

In general, a phenomenon such as a water-hammer happens at such a place as a bent part of a pipe line through which a fluid passes, that is to say, where a flow of a fluid is cut off. This water-hammer may cause a big noise as well as a big vibration which can damage the pipe line and further is well known to be a primary factor of the reduction of a building life span.

A water hammer arrester is mounted on a pipe arrangement line against the water hammer which damages a pipe line or a building. The water hammer arrester includes a piston moving to correspond to a change of a water pressure running along the pipe line, a housing having the piston built-in to stand against a water hammer and a nipple for connecting the housing with the pipe line. Consequently, the housing has a predetermined length so that the piston could be operated therein.

The water hammer arrester having this housing is illustrated in Joserb P. Isrnet et al. U.S. Pat. No. 4,819,698 and in Charles H. Perrott et al. U.S. Pat. No. 5,385,172. The housing therein is provided with an internal pressure chamber, in which the piston operates.

The internal chamber is called an air chamber and filled up with air. When the piston goes up by the water hammer, an air pressure is acted by the piston in the internal pressure chamber. If a water hammer phenomenon happens in a pipe line provided with a water hammer arrester, water or gas like a steam running along the pipe line comes rapidly into the housing through a connector and then the piston is pushed within the housing by a fluid.

At this time, the piston compresses an air within the internal pressure chamber and a compressive force of an air becomes bigger the more the piston goes up to an upper direction of the internal pressure chamber by the water hammer. Consequently, as an air pressure working against the piston and a fluid pressure originated by the water hammer are canceled by each other, the water hammer can be prevented.

The internal pressure chamber having a low pressure can stand against a fluid pressure, so that the water hammer could not be prevented. For this reason, the volume of the internal pressure chamber needs to have a predetermined size to make the internal pressure chamber have a predetermined pressure and so the housing is composed to have a predetermined length. The housing has commonly an elongated shape in order for the piston to move therein.

However, as the water hammer arrester is mounted on a pipe arrangement path of a pipe line, on which various pipe lines are arranged, a space for mounting them is very small. As the housing, through which a fluid flows, is mounted on the small space, the smaller a length of the housing is, the better it is.

In the meantime, a size of the internal pressure chamber of the housing in a conventional water hammer arrester is calculated by summing up a volume occupied by the piston and a volume filled up with a reaction force medium in the upper piston. The length of the housing is determined according to the above described volume. In other words, as for the calculated length of the housing, the length corresponding to the volume occupied by the piston is distinctly distinguished from the length corresponding to the volume filled up with the reaction medium and the housing must have inevitably so much length as the sum of those lengths. For that reason, it is very difficult to shorten the length of the housing.

In addition, in the conventional water hammer arrester, the internal pressure chamber is filled up with the air. The filled air comes to have a predetermined pressure which presses the piston. As the air shows, as well known, a big contraction or expansion rate, the internal pressure of air working on the piston is changed according to the change of the contraction or expansion rate of air by the rotation of seasons.

As the internal pressure of air corresponding to the fluid pressure working on the piston is changed by the change of the temperature, the conventional water hammer arrester having the internal pressure chamber filled up with air cannot completely function as a water hammer arrester.

Moreover, a connector such as a nipple connected to the pipe, as above described, is fixed to a lower part of the housing in the water hammer arrester. The connector is commonly formed as a screw part and screwed on the pipe line. Accordingly, the connector must keep an airtightness not to leak a fluid coming into the housing when the connector is connected to the pipe line. Conventionally, the two methods for fixing the connector to the housing are employed as follow.

The one method says that the lower part of the housing, as U.S. Pat. No. 4,819,698 shows, is provided with a screw part, which is connected to the connecting member such as a nipple. However, as the housing is rotated while the connecting member is connected to the pipe line, the method has a problem that a connection between the lower part of the housing and the connector is loosen. Accordingly, the problem is, a clearance between the lower part of the housing and the connector occurs and so a fluid like water or steam is leaked through the clearance.

The other method says that, as shown in U.S. Pat. No. 5,385,172 and No. 3,633,627, the nipple and the lower part of the housing are connected by the welding. This method has an advantage to reduce the leaking probability of the fluid in the connecting part. Nevertheless, the way of fixing the connector by the welding requires a welding work by hand, which needs many labors and has a low productivity and so the production cost increases.

SUMMARY OF THE INVENTION

Accordingly, in order to overcome such drawbacks in the conventional art, it is therefore an object of the present invention to provide a water hammer arrester using a fluid pressure not being affected by temperature change.

It is another object of the present invention to provide a water hammer arrester having a relative short length and so being able to be installed in a small space too.

It is another object of the present invention to provide a water hammer arrester capable of preventing a leakage of fluid between a lower end and a connector when the connector is installed in a pipe line.

To achieve these objects and other advantages and in accordance with the purpose of the present invention, as embodied and broadly described, there is provided a water hammer arrester comprising: a housing formed as a cylinder having a closed upper end and having an internal pressure chamber receiving a reaction medium at the top thereof; a piston being slidably installed within the housing and having a space communicating with the internal pressure chamber and receiving the reaction force medium therefrom; and a connector being connected to a lower end of the housing by pressing and having a thread formed at an end.

Herein the reaction force medium is nitrogen gas.

The connector has grooves formed on a circumference and the lower end of the housing can be connected closely with the connector as being compressed toward said grooves by a pressing force.

The grooves have an arc section.

A number of the grooves are at lest two and the lower end of said housing is compressed toward the pressing groove by the pressing force.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 1 is a perspective view of a water hammer arrester according to the present invention, FIG. 2 is a total sectional view of the water hammer arrester according to the present invention, FIG. 3 is an exploded perspective view of the water hammer arrester carried out by the first embodiment according to the present invention, FIGS. 4a–4b are flow diagrams explaining a fixing of a connector of the first embodiment according to the present invention, FIG. 5 is an exploded perspective view of the water hammer arrester carried out by the second embodiment according to the present invention, FIGS. 6a and 6b are partially cut-away sectional views explaining a fixing of a connector of the second embodiment according to the present invention, FIG. 7 is a total sectional view illustrating a fixing of the connector of the second embodiment according to the present invention, FIG. 8 is a total sectional view of the water hammer arrester of the connector of the third embodiment according to the present invention being fixed.

DETAILED DESCRIPTION OF PREFERRED EMBODIMENT

The water hammer arrester according to the present invention will be apparent from the following detailed description in conjunction with the accompanying drawings.

Figure 1:
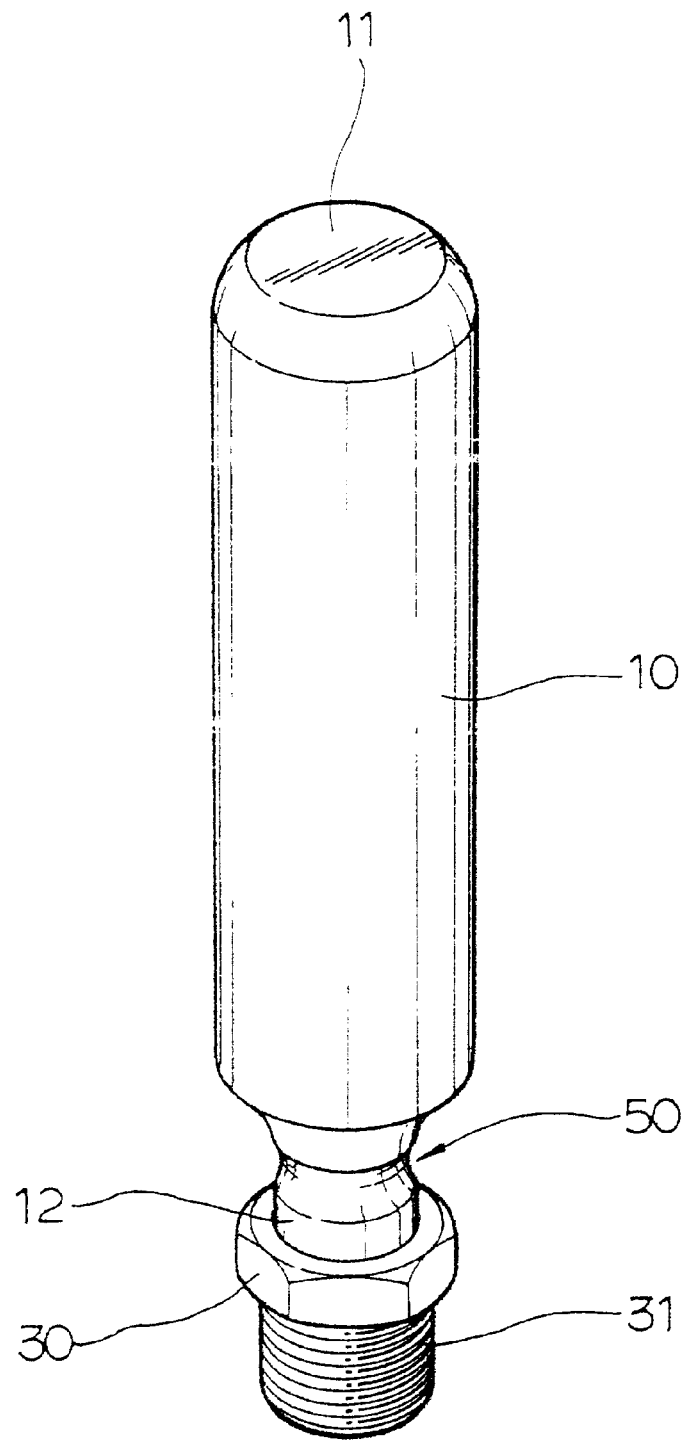
Figure 2:
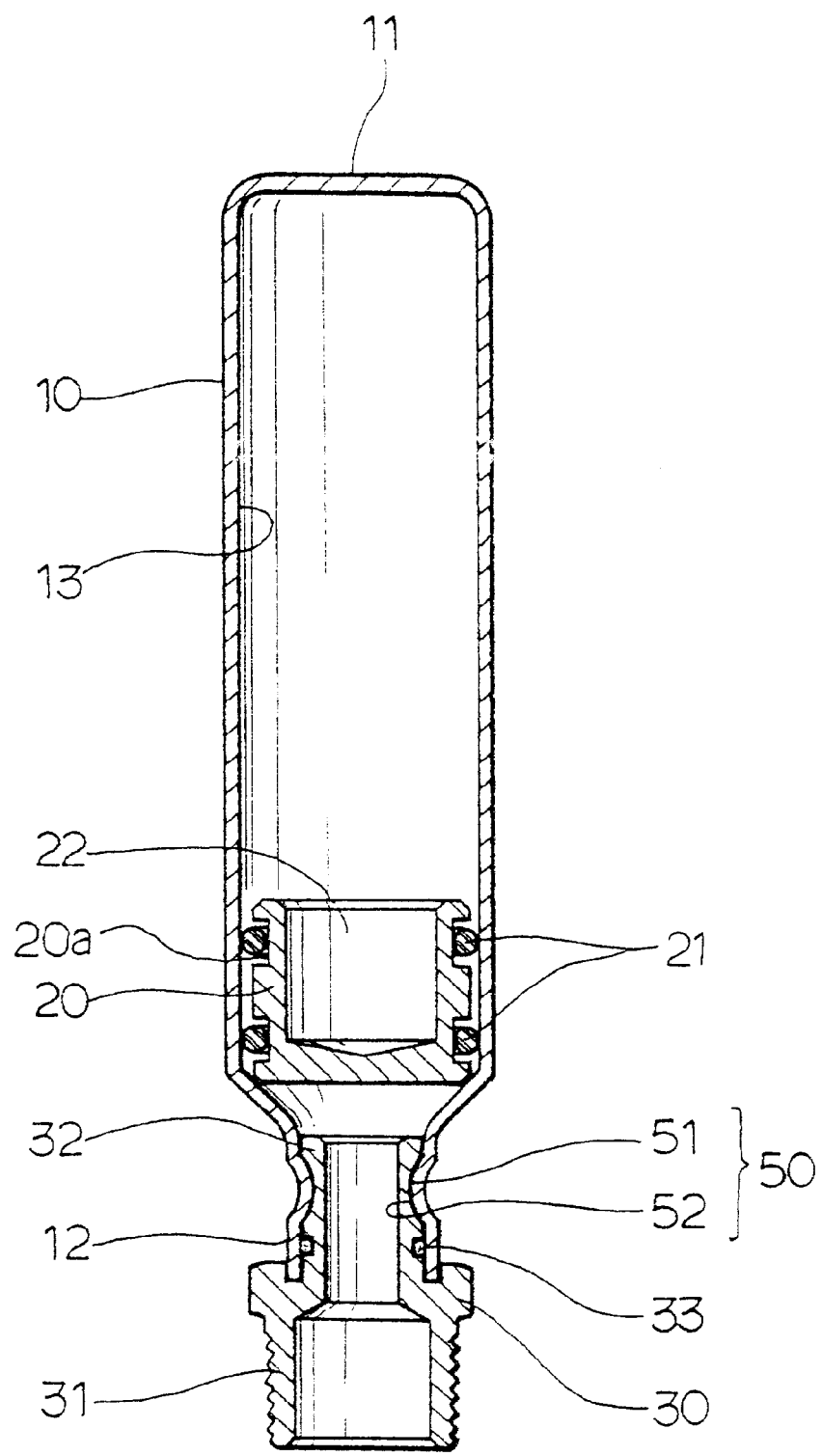

FIGS. 1–2 are a perspective view and a total sectional view of a water hammer arrester according to the present invention. The water hammer arrester provided with a closed upper part 11 and an opened lower part 12, as shown in FIGS. 1–2, includes a cylinder-shaped housing 10, a piston 20, which is located within the housing 10 and operated by a fluid pressure conveyed from a pipe line, and a connector, which prevents the secession of the piston 20 from the housing 10 and is connected to a lower part of the housing 10. An internal pressure chamber 13 of the housing 10 is filled up with nitrogen gas as a reaction medium having relatively small expanding and contracting rate according to the temperature change.

The circumference of the piston 20 has a plurality of grooves 20a, which is provided with a plurality of o-rings 21 to keep gas tight between internal surfaces of the housing 10. The piston 20 is provided within the housing with rings in the grooves 20a. The piston 20, as shown in FIG. 2, is provided in an upper part thereof with a space 22, which communicates with the internal pressure chamber 13 of the housing 110. Therefore, the space 22 of the piston 20 is filled up with reaction medium such as nitrogen gas.

Accordingly, a volume of reaction medium is the sum of a volume of the internal pressure chamber 13 and a volume of the space 22 of the piston 20.

The volume of reaction medium is designed in connection of the fluid pressure of a pipe line. For example, a volume of reaction medium of the water hammer arrester is designed commonly to have a volume of 50 $cm^3$ for a fluid pressure of 10 $kg/cm^3$. Further, the housing 10 is fabricated to have a prescribed diameter and length in order to an above-described volume of reaction medium.

Consequently, in comparison with a conventional water hammer arrester having a volume of reaction medium provided in an upper part of the piston, the housing 10 of the water hammer arrester according to the present invention can have a shorter length when the volume of reaction medium has a same volume of 50 cm, as the conventional.

Therefore, the housing 10 of the water hammer arrester according to the present invention can have a shorter length than the conventional housing, and this reduction of the housing length results in the reduction of the total length of the water hammer arrester and so has a reduction of housing materials as well as convenience in the spatia-temporal aspect.

Furthermore, as the present invention employs nitrogen gas, insensitive to the temperature change, as reaction medium, a function of the reaction medium standing against the fluid pressure can be more certainly carried out. That is to say, the nitrogen gas employed as the reaction medium in the present invention has a small expanding and contracting rate according to the temperature change in comparison with an air.

Figure 3:
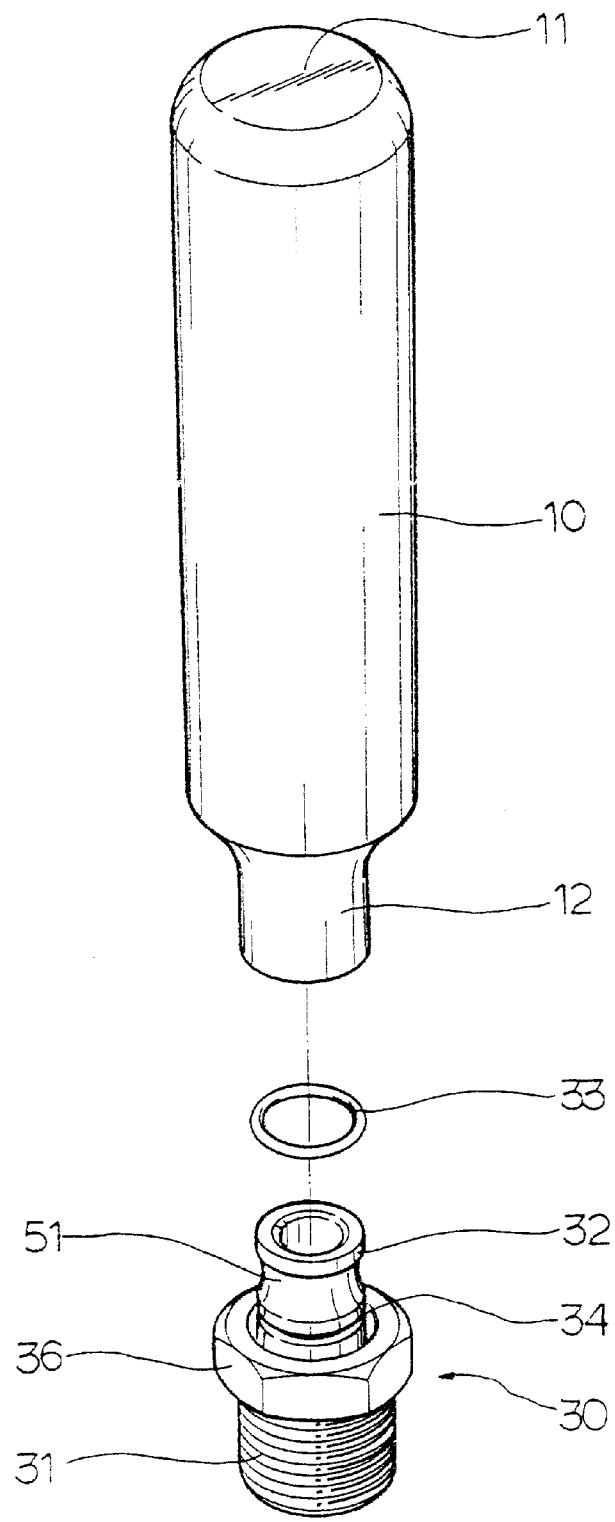

FIG. 3 is a perspective view illustrating a separated state of the housing 10 and a connector 30 in the water hammer arrester according to the first embodiment of the present invention. The connector 30 includes a screw part 31 formed in the lower part, a cylinder part 32 inserted into a lower part 12 of the housing 10 and fixed by pressing, and a hexagonal head part 36 provided between the screw part 31 and the cylinder part 32. The cylinder part 32 is provided with a pressing groove 51 having a circular arc-shaped section and a groove 34 formed with o-ring 33 is provided between the pressing groove 51 and the hexagonal head part 36.

Figure 4A:
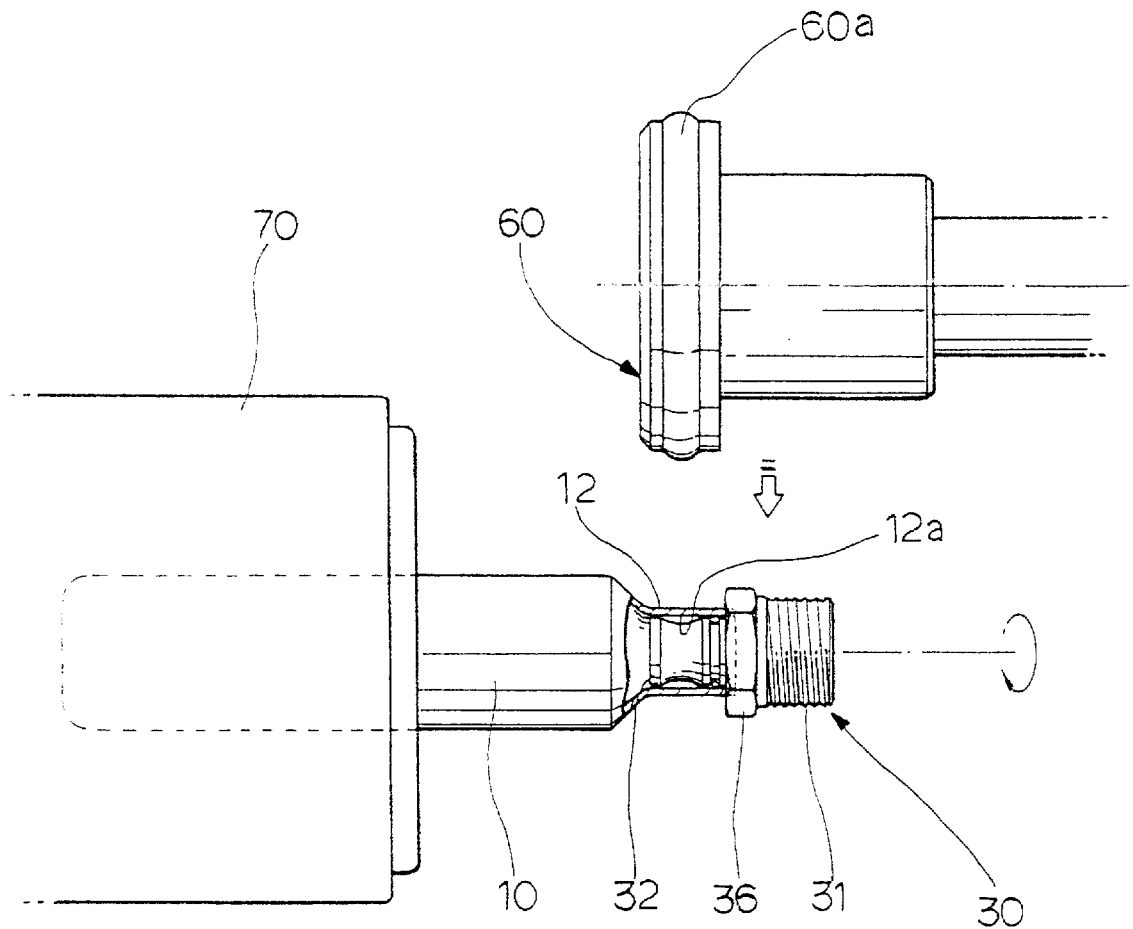
Figure 4B:
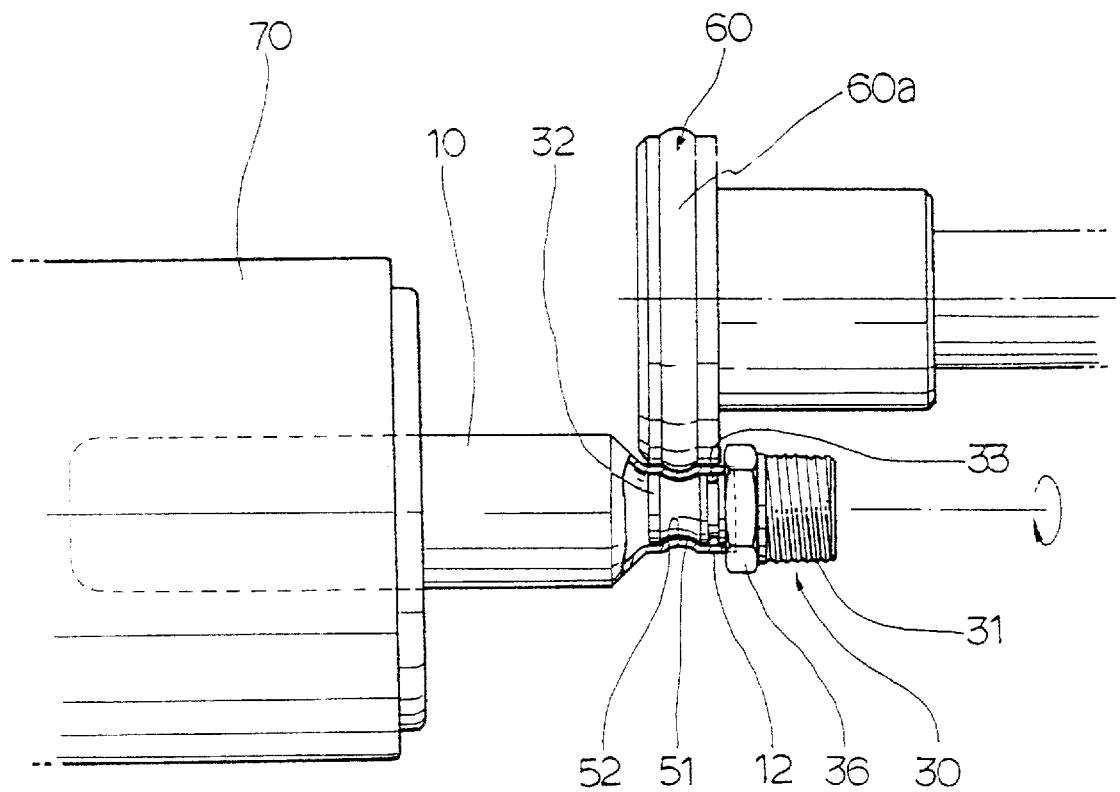

The connection of the housing 10 with the connector 30 is carried out as follows: the o-ring 33 is received in the groove 34 and the cylinder part 32 of the connector 30 is inserted into the lower part 12 of the housing 10 and then, as shown in FIGS. 4a–4b, the housing 10 is fixed to a chuck 70 such as a lathe and, while the housing 10 is rotated by the chuck 70, a pressing roller 60 having a protrusion 60a with a same semidiameter as the pressing groove 51 presses the lower part 12 of the housing 10, in which the pressing groove 51 is located.

In the lower part 12 of the housing 10, as shown in FIG. 4b, a pressing convex part 52 having a same semidiameter as the pressing groove 51 is protruded toward the pressing groove 51 by the protrusion 60a of the pressing roller 60 and the pressing convex part 52 is pressed into the pressing groove 51 by the pressure of the pressing roller 60. Therefore, the connector 30 is connected closely and solidly to the lower part 12 of the housing 10.

Figure 5:
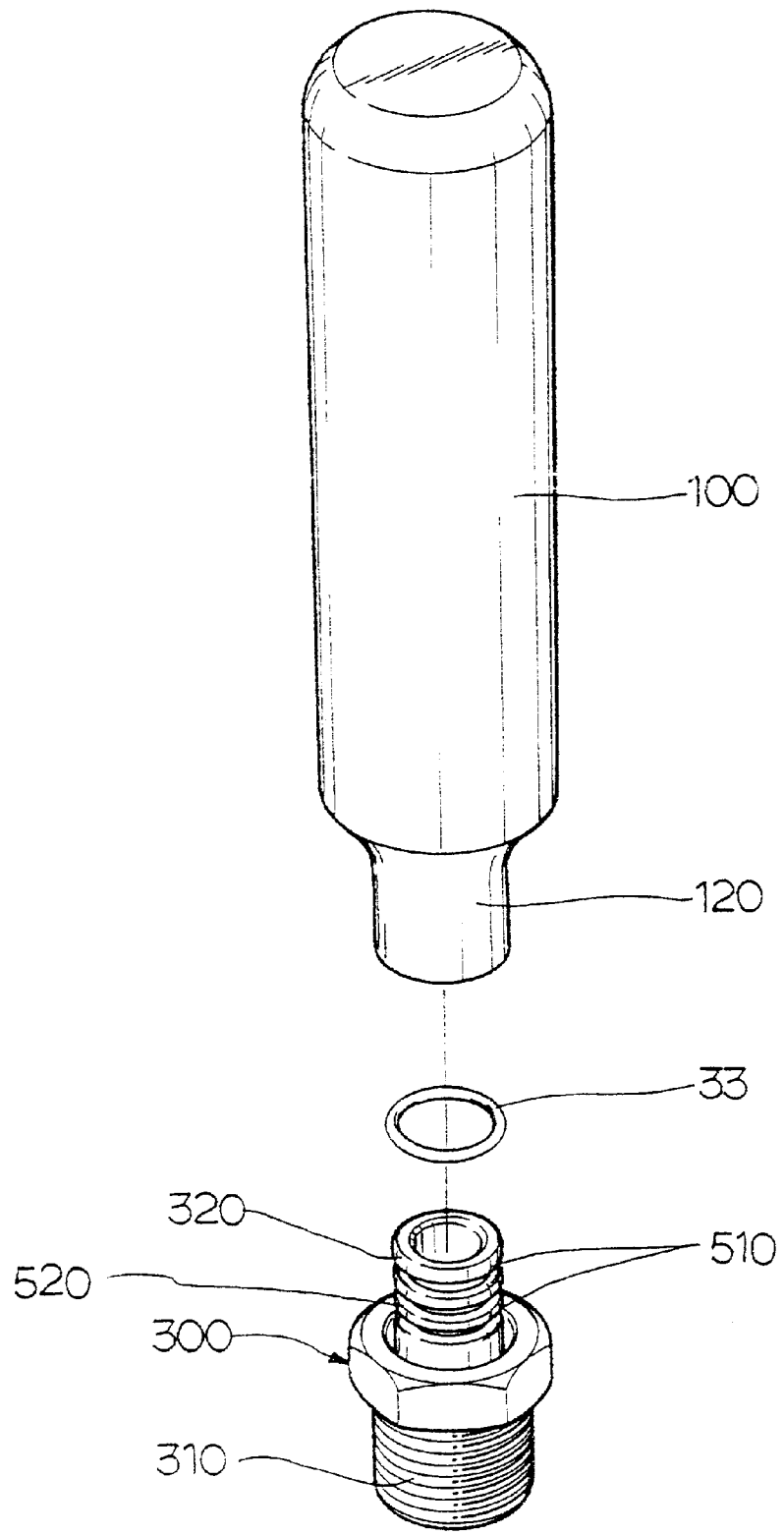
Figure 6A:
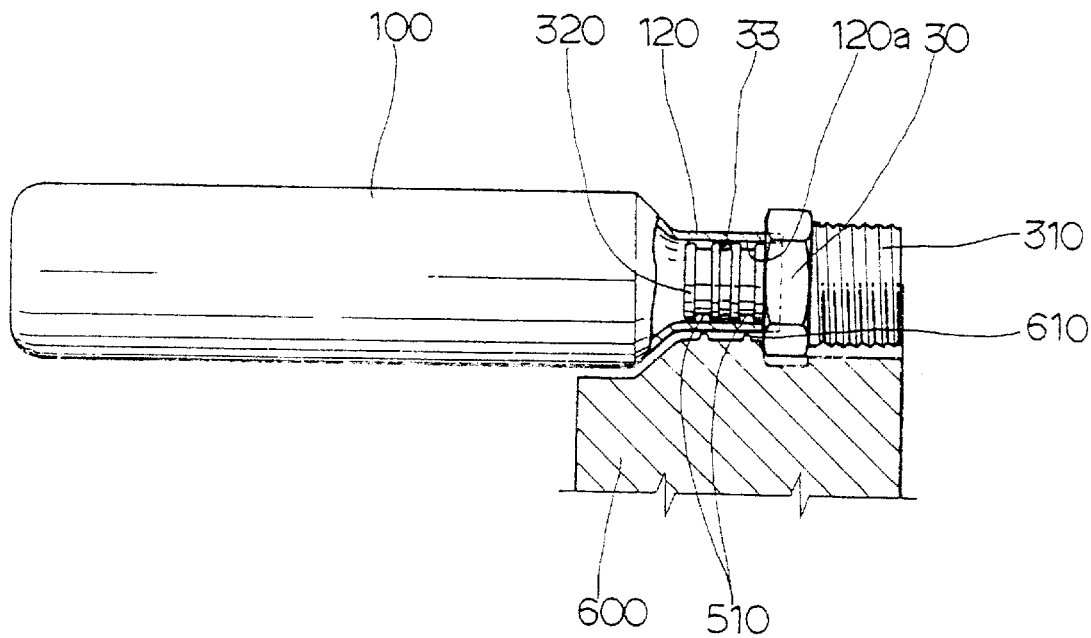
Figure 6B:
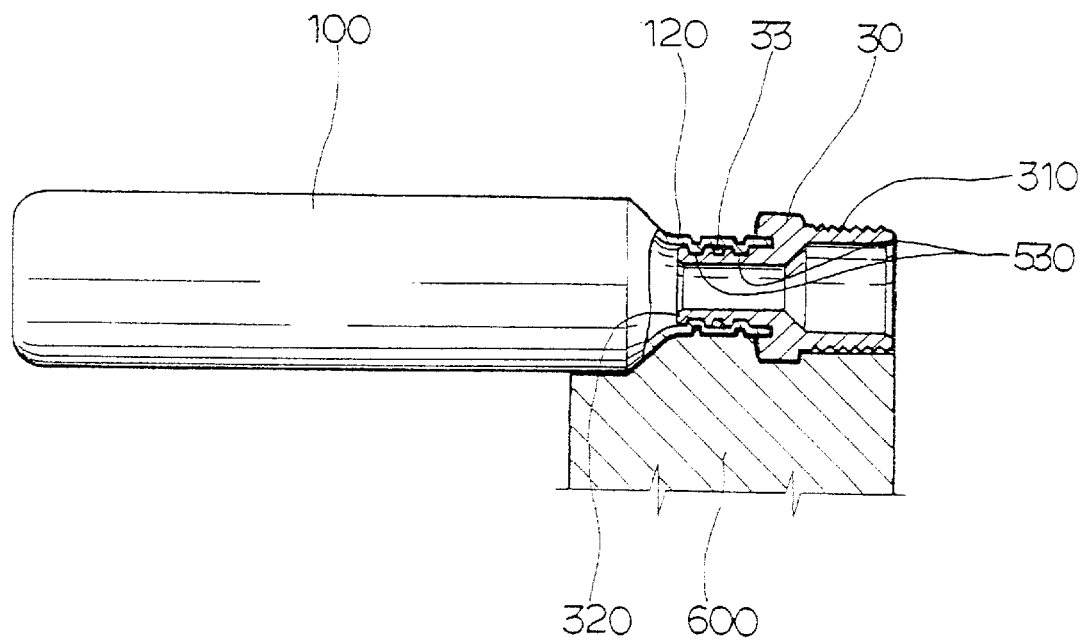

FIG. 5 is a perspective view illustrating a separated state of a housing 100 and a connector 300 in the water hammer arrester according to the first embodiment of the present invention. FIGS. 6a–6b are perspective views illustrating a state how the connector 300 is connected to a lower part 120 of the housing 100 by a compressive metal mold or a roller 600.

Figure 7:
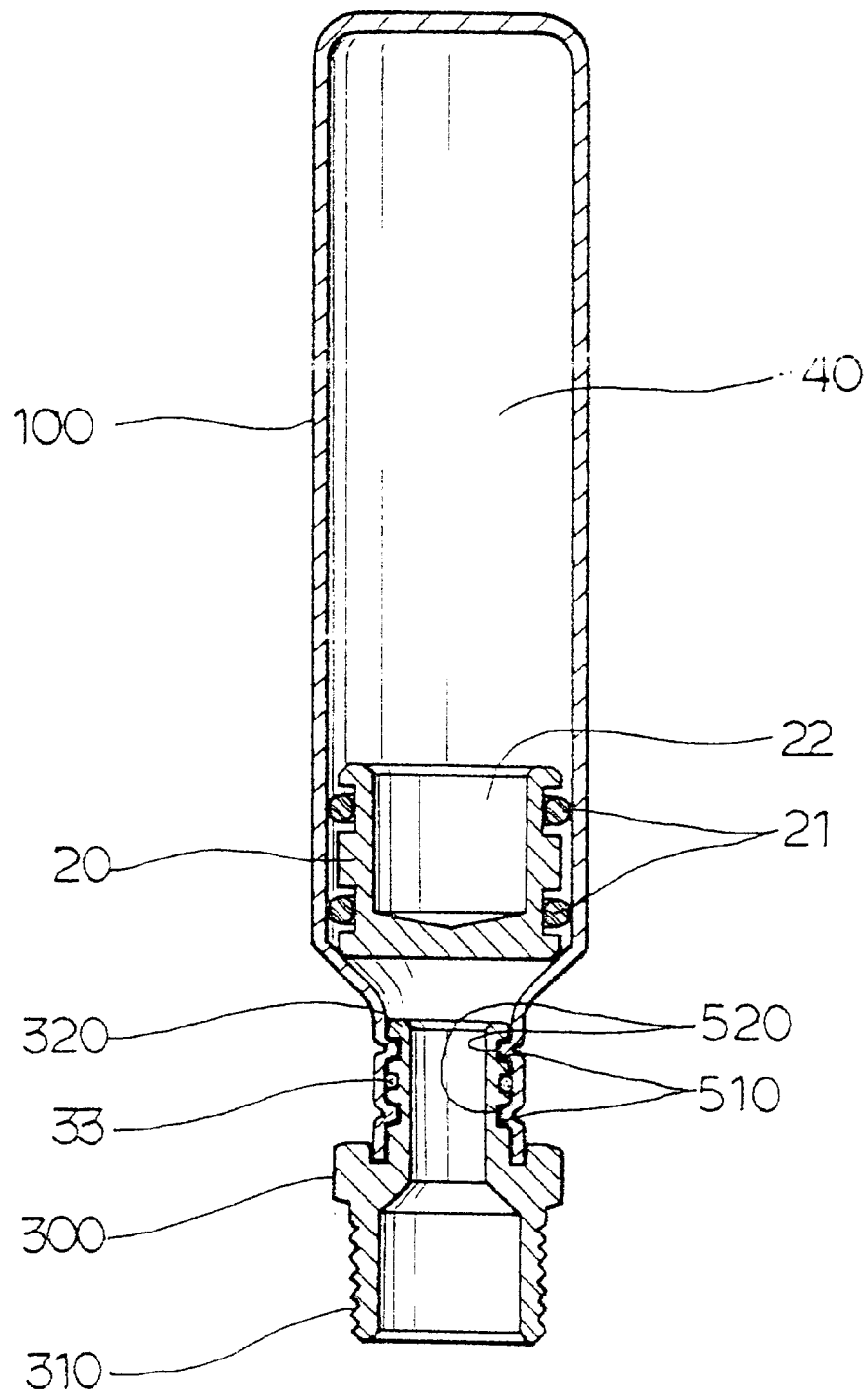

In the connector 300, the cylinder part 320 has at least two pressing grooves 510, which has a narrow width, and grooves 520 receiving o-ring 33 are formed between pressing grooves 510. In this embodiment too, in a state that the o-ring ring 33 is received safely in the groove 520, the cylinder part 320 is inserted into the lower part 120 of the housing 100 and pressed by the compressive metal mold or roller 600 as shown in FIG. 6a–6b. A pressing protrusion 610 having same shape as the pressing groove 510 formed on the cylinder 320 of the connector 300 is formed in the roller 600. As a convex surface 530 is pushed into the pressing groove 510 of the lower part 120 of the housing 100 by the pressing protrusion 610, the connector 300, as shown in FIG. 7, can be connected solidly and closely to the lower part 120 of the housing 100 like in the first embodiment.

Figure 8:
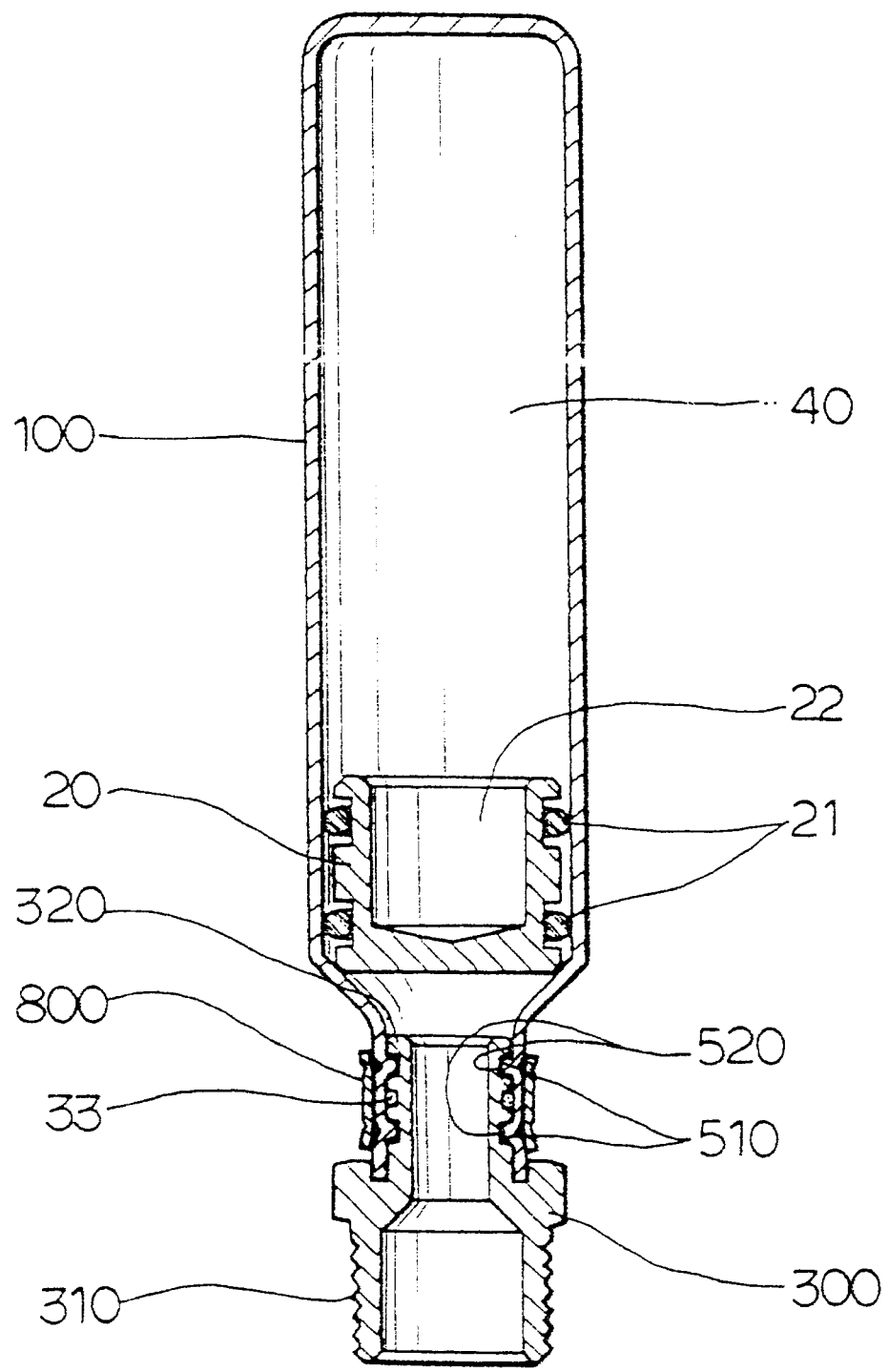

FIG. 8 is a sectional view illustrating a connector of the water hammer arrester according to the third embodiment of this invention. The connector of the third embodiment, like the second embodiment, is formed by the convex surface 520 which the lower part 120 of the housing 100, as in the second embodiment, is compressed to the pressing groove 510 of the connector 300.

However, the difference of the third embodiment from the second lies in that said connecting operation is carried out in a state that a compressive ring 800 is inserted into a circumference of the lower part 120 of the housing 100. In this case, as the compressive ring 800 compresses all connecting parts, the connection can be carried out more solidly and closely than in the case of the second embodiment without the compressive ring 800.

Employing nitrogen gas receiving relative small influence from the temperature change as reaction medium injected into the housing, the water hammer arrester according to the present invention receives relative small change of the internal pressure and so can improve the reliability of the pressure.

Further, as the space 22 formed in the upper part of the piston in the water hammer arrester according to the present invention functions as the volume for receiving the reaction medium, it has shorter length of the housing in comparison a with the conventional water hammer arrester and so can be easily mounted in small space too.

Furthermore, as the connector connected to the lower part of the housing in the water hammer arrester according to the present invention is connected to the lower part of the housing through the pressing operation, the leak of the fluid between the lower part and the connector can be prevented certainly when the arrester is mounted to a pipe line.

It will be apparent to those skilled in the art that various modifications can be made in the present invention, without departing from the spirit of the invention. Thus, it is intended that the present invention cover such modifications as well as variations thereof, within the scope of the appended claims and their equivalents.

What is claimed is:

1. A water hammer arrester comprising:

a housing formed as a cylinder having a closed upper end, an internal pressure chamber receiving a reaction force medium, and an opening having a circular distal end of one portion of said opening;

a piston being slidably installed within said housing and having a space communicating with said internal pressure chamber and receiving said reaction force medium;

a connector connected to said opening of said housing having a thread formed on one end of said connector, a first annular groove formed on a circumferential outside surface of the other end of said connector, and a second annular groove formed on a radial surface of said connector and disposed between said first annular groove and said thread, and said second annular groove accommodating the insertion of said circular distal end of said opening; and a convex portion formed on the other portion of said opening, fitting said first annular groove.

2. The arrester as claimed in claim 1, wherein said reaction force medium is nitrogen gas.

3. The arrester as claimed in claim 1, further comprised of the other portion of said opening compressed toward said first annular groove of said connector by a pressing force in order to form said convex portion after said first groove has been inserted into said second annular groove.

4. The arrester as claimed in claim 3, wherein said first annular groove has an arc section.

5. The arrester as claimed in claim 1, further comprised of:

a plurality of said first annular grooves formed on said circumferential outside surface of the other end of said connector; and the other portion of said opening of said housing compressed toward said first annular grooves by the pressing force in order to form a plurality of convex portions fitting said first annular grooves.

6. The arrester of claim 1, further comprised of:

a third groove formed on said connector and between said first groove and said second groove;

a ring inserted into said third groove and disposed between the outside said connector and the inside of said opening.

7. The arrester of claim 1, further comprised of said second groove having a substantially same width as a radial thickness of said circular distal end of said opening.

8. The arrester of claim 1, further comprised of said convex portion of said opening inserted into said first annular groove of said connector, so as to prevent said connector from being detached from said opening of said housing.

9. The arrester of claim 1, further comprised of said circular distal end of said opening inserted into said second annular groove of said connector so as to prevent said circular distal end of said opening from being radially expanded and being detached from said connector while said convex portion of said opening is attached to said first annular groove of said connector.

10. An arrester, comprising:
- a housing having a chamber accommodating a piston slidably moving within said chamber and a closed cap fixed to one end of said housing and covering said chamber;
- an opening extended from the other end of said housing, having a circular distal end formed on one portion of said opening;
- a connector connected to said opening, having a first groove formed on a circumferential outer surface of said connector and a second groove formed on a radial surface of said connector;
- a circular distal end formed on end portion of said opening, inserted into said second groove a while said connector inserted into said opening; and
- a convex portion formed on said opening, fitting said first groove while said circular distal end is inserted into said second groove.

11. The arrester of claim 10, further comprised of said convex portion of said opening fixed to said first groove of said connector so as to fixedly connect said connector to said housing while said circular distal end is inserted into said second groove.

12. The arrester of claim 10, further comprised of said convex portion compressed toward said first groove by a pressing force to fit said first groove after said circular distal end has been inserted into said second groove.

13. The arrester of claim 10, further comprised of a third groove formed on said connector, accommodating a ring, inserted between said opening and said connector.

14. The arrester of claim 10, further comprised of said second groove having the same width as a radial thickness of said circular distal end of said opening.

15. The arrester of claim 10, further comprised of:
- a plurality of first grooves formed on the circumferential surface of said connector; and
- a plurality of convex portions formed on said opening, compressed radially, fitting said first grooves respectively.

16. The arrester of claim 10, further comprised of said circular distal end being prevented from being radially expanded while inserted into said second groove.

17. The arrester of claim 10, further comprised of said connector fixed to said opening, protected from being detached from said opening while said circular distal end and said convex portion of said opening fixed to said first groove and said second groove of said connector respectively.

* * * * *